Figure 1:
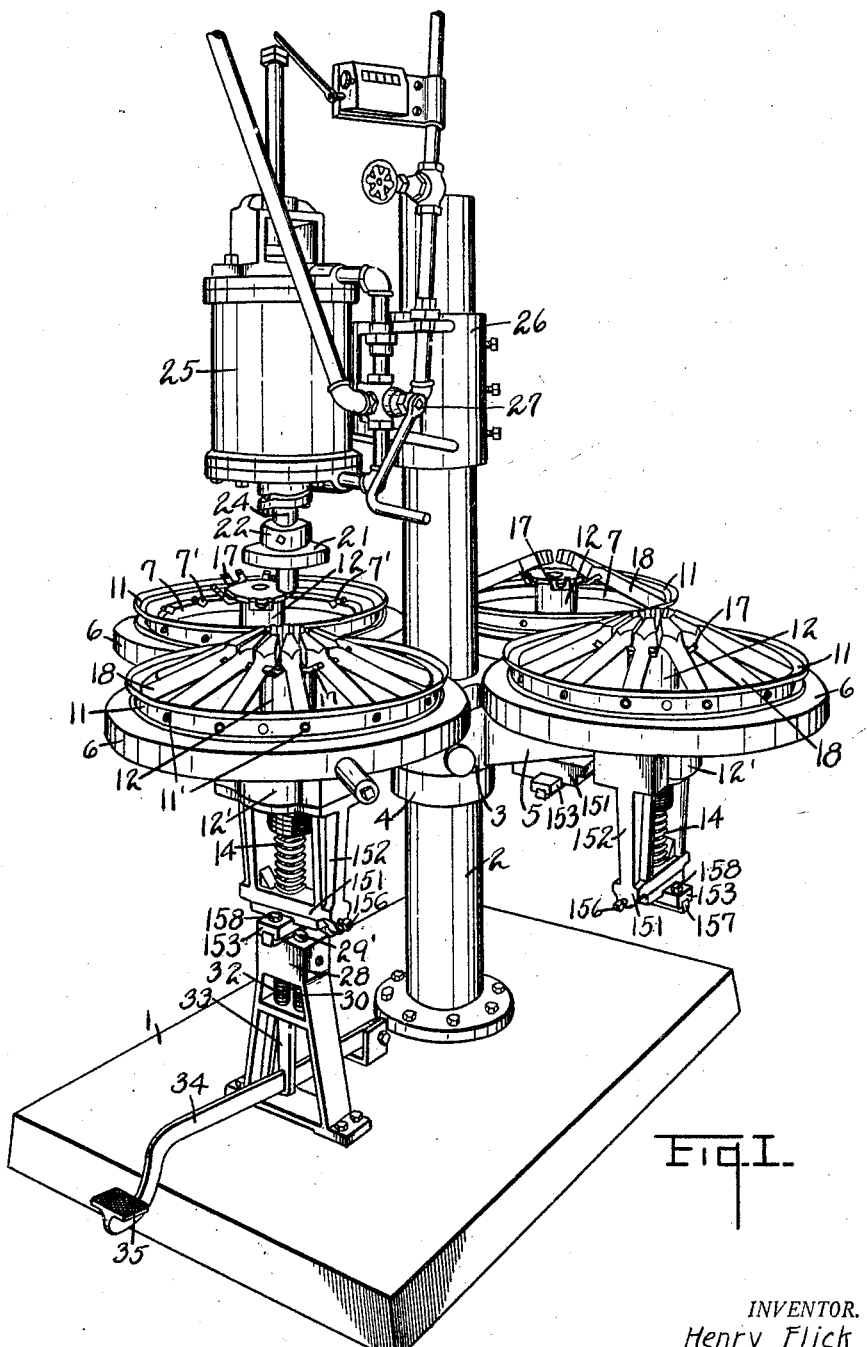

May 12, 1925.  
H. FLICK  
1,537,662  
WHEEL MANUFACTURING MACHINE  
Filed Oct. 4, 1921  3 Sheets-Sheet 1

INVENTOR.
Henry Flick
BY
ATTORNEYS.

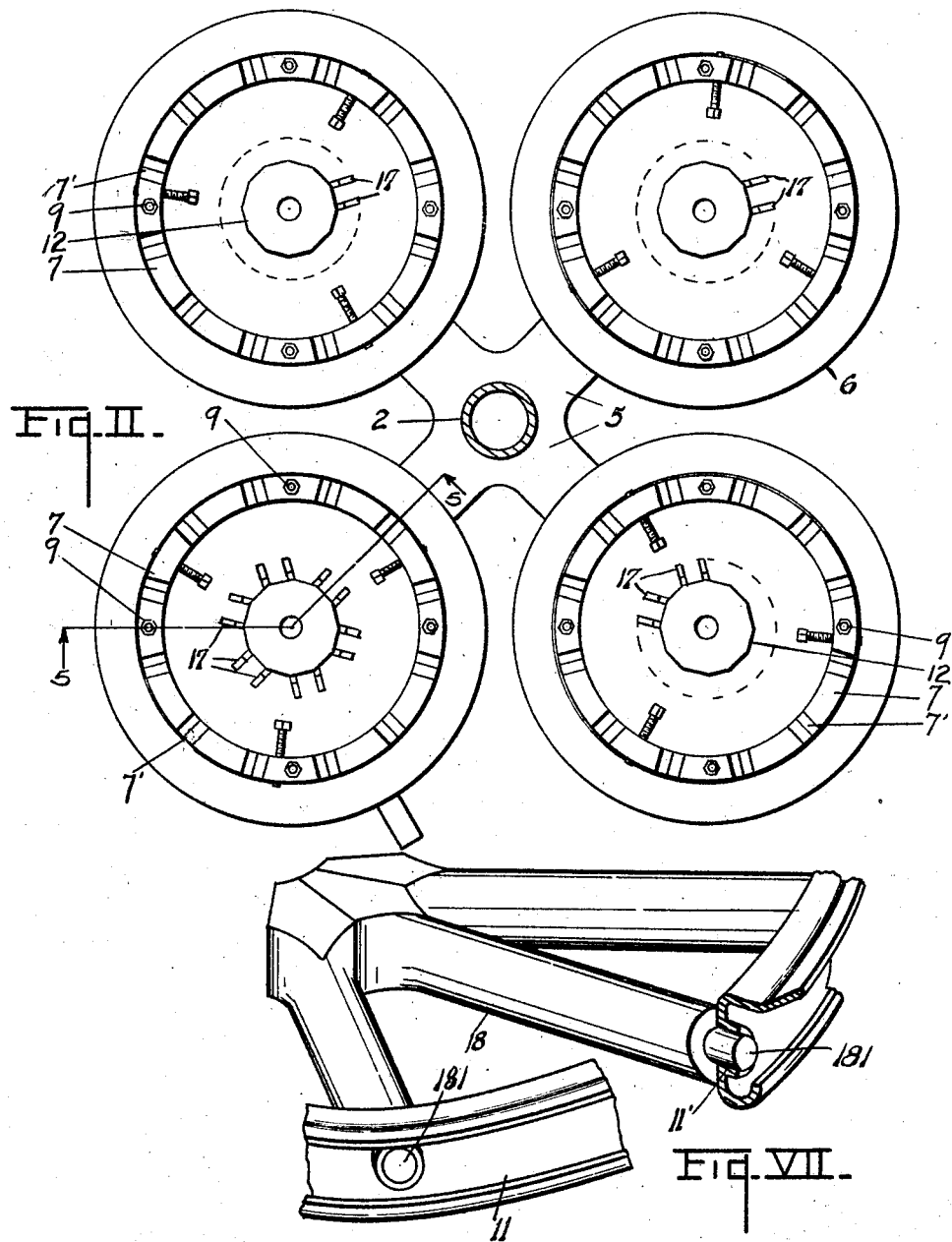

May 12, 1925. 1,537,662
H. FLICK
WHEEL MANUFACTURING MACHINE
Filed Oct. 4, 1921   3 Sheets-Sheet 3
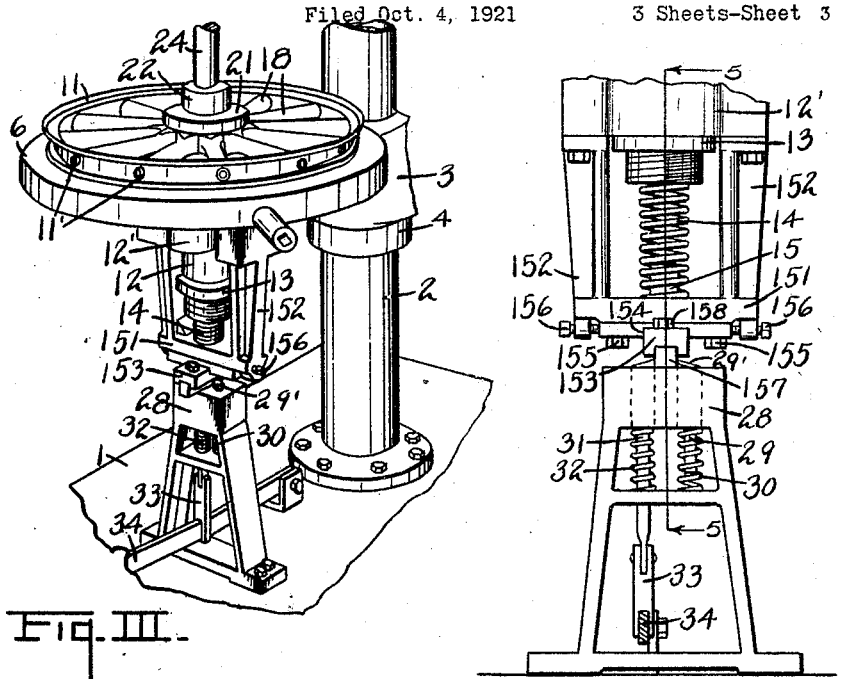
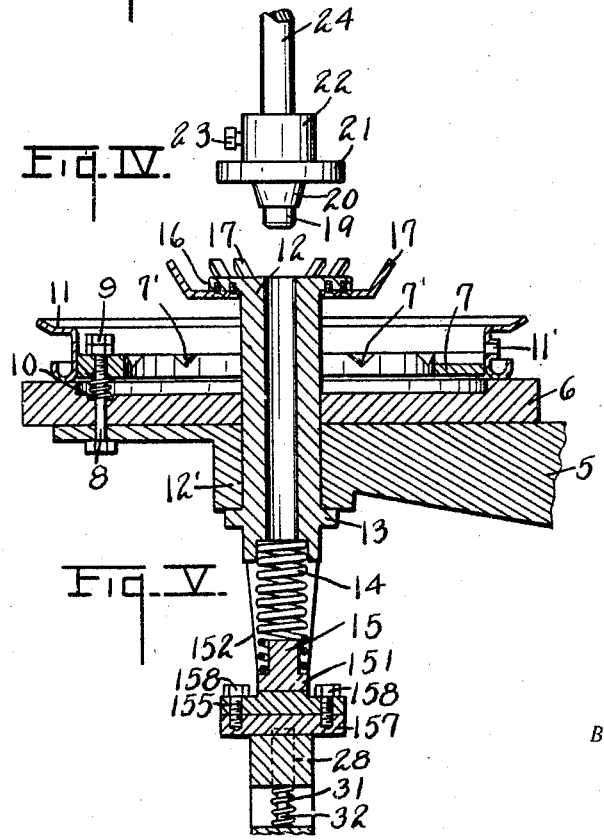
INVENTOR.
Henry Flick
BY
ATTORNEYS.

Patented May 12, 1925.

1,537,662

UNITED STATES PATENT OFFICE.

HENRY FLICK, OF JACKSON, MICHIGAN, ASSIGNOR TO HAYES WHEEL COMPANY, OF JACKSON, MICHIGAN.

WHEEL-MANUFACTURING MACHINE.

Application filed October 4, 1921. Serial No. 505,244.

*To all whom it may concern:*

Be it known that I, HENRY FLICK, a citizen of the United States, residing at Jackson, county of Jackson, State of Michigan, have invented certain new and useful Improvements in Wheel-Manufacturing Machines, of which the following is a specification.

This invention relates to improvements in wheel manufacturing machines.

The objects of the invention are:

First, to provide a machine and process for rapidly manufacturing wood wheels, particularly with metallic tires.

Second, to provide a machine and process for quickly assembling properly mitred spokes in a metallic felly.

Further objects, and objects relating to details and economies of construction and operation will definitely appear from the detailed description to follow.

The objects of the invention are accomplished by the devices and means described in the following specification. The invention is clearly defined and pointed out in the claims.

A structure which is a preferred embodiment of the invention is fully illustrated in the accompanying drawing, forming a part of this application, in which:

Fig. I is a perspective view of the machine in use showing the vacant table and tables with spokes in place and with the press in elevated position over a wheel felly filled with spokes ready to press.

Fig. II is a plan view of the turntable, the supporting column being shown in section, showing the disposition and arrangement of the empty disks.

Fig. III is a detail perspective view of a single table and arm of the turntable under the press showing the press down and the wheel in completed form, all the tables being the same.

Fig. IV is a detail of the tapered plug plunger head for forcing the spokes into position.

Fig. V is a detail transverse sectional view on line 5—5 of Figs. II and VI, the spokes being removed.

Fig. VI is a detail front elevation view of the indexing and releasing device, the foot lever being shown in cross section.

Fig. VII is a detail perspective view of a portion of the wheel, the metallic felly being cut in section to show the spoke mortise and tenon.

In the drawing similar numerals of reference refer to similar parts throughout the several views and the sectional views are taken looking in the direction of the little arrows at the ends of the section lines.

Considering the numbered parts of the drawing by their numbers, 1 is the base. 2 is an upright cylindrical supporting column for the machine. 3 is the main central hub of the turntable of the machine turning on a suitable bearing on collar 4.

This turntable is provided with radial arms 5 each carrying identical table disks and wheel assembling means comprising the circular table 6 with the vertically movable assembling ring 7 containing the notches 7′ for the spokes. The ring and plate 6 are retained securely in place by bolts 8 having lock nuts 9 at their upper ends, (see Fig. V) springs 10 being interposed on the bolts beneath the said ring 7 and above table 6. The ring 7 is of the inside diameter of the felly or rim 11 into which spokes are to be inserted.

A metal rim of the usual form containing spoke mortises 11′,—see Fig. V, is shown in position. A central depressible plunger 12, cylindrical in form, is adapted to reciprocate within a hub 12′ at the outer end of each arm 5 and through a central opening in the plate 6. This plunger is shouldered at 13 to limit its upward movement and is held yieldingly in its upper position by the spring 14 there-beneath disposed upon the stud 15 on the cross yoke 151, supported by hanger arms 152,—see Fig. V. A bar 153 with seat 154 is secured to the yoke by cap screws 155 and is adjustable by means of set screws 156. A stop bar 157 is held in the seat by screws 158.

On the flange 16 at the upper end of the plunger 12 is secured bifurcated radial arms 17 for receiving and locating the inner heads of spokes,—see particularly Fig. V. The spokes 18 are disposed between the fingers of these arms with their tenon ends 181 disposed within the mortises 11′.

A plunger 19 with a tapered plug 20 and flange 21 is disposed to enter the space between the inner ends of the spokes and force them downwardly and outwardly into the metallic rim or felly. The plunger is provided with a heavy hub 22 secured by set screw 23 to the piston rod 24 of the steam cylinder 25 above,—see Fig. I. This steam cylinder is not detailed, as such structures are common for plunger purposes.

This cylinder is supported by the bracket 26 on the central column 2 and is provided with a hand throttle.

28 is the indexing standard provided with the yielding latch 29 held upwardly by the spring 30 having a beveled surface 29′ to permit the locating or stop bar 157 of each table to swing to position. Stop latch 31 is held upwardly by spring 32 and is depressed by the link 33 connected to the lever 34, which is provided with foot pedal 35 so that when the table is swung to position, it is located automatically by depressing the latch 29, which permits the stop bar 157 to swing against the depressible latch 31. When the plunger has been operated the machine is released and can be swung to the next position.

In operation the work begins for the production of each wheel by the heating of the felly 11 after the manner of heating tires, preliminary to setting the same. The expanded felly is placed upon the table 6 concentric with the ring 7 at the first station. When this work is accomplished the machine is swung one step in advance and the next man at the second station places one-half of the spokes 18, namely, six, in one-half of the wheel. While he is placing the spokes the next felly is being placed upon the table that has now swung to the first station. As soon as this work is done the machine is swung to the next position, when the balance of spokes is put in place at the third station, the second man setting up his half of the spokes of the next succeeding wheel at the second station. The wheel with the spokes all in position in inclined relation is then swung to the fourth station under the steam cylinder plunger 25, it being located by the latch means, as seen in Fig. V. When the plunger is operated the center passes down between the spokes, the beveled portions crowd the same outwardly against the rim and the flange 21 presses the spokes into flat relation at the center of the wheel, the wheel being dished or not, as desired. The operator then elevates the plunger and depresses the pedal 35 and removes the wheel, passing the empty table to the first station to receive another expanded felly. In this way it will be observed that it takes four men to operate the machine to advantage—one at each of the four stations. Great advantage in division of labor results from the turntable and its stations. However, the whole operation might be done at a single station.

The process might be otherwise performed by disposing the spokes in conical relation with their tenons in the mortises of the rim, pressing the inner ends of the spokes at the center of the wheel and permitting the felly to contract.

Having thus described the invention, what is claimed as new and desired to secure by Letters Patent, is:

1. A machine for assembling wheels comprising a turntable with a plurality of arms, a circular table carried by each arm, a depressible central locating ring for receiving an expanded felly outside thereof and provided with spoke notches to receive spokes, a depressible plunger center with radial arms for receiving the spokes, a plunger with tapered plug for engaging the inner ends of the spokes and with a flange for pressing the same to position, means for actuating the plunger, and means for locating the tables successively under the plunger, coacting as specified.

2. A machine for assembling wheels comprising a turn table with a plurality of arms, a circular table carried by each arm, a central locating ring for receiving an expanded felly outside thereof and provided with spoke notches to receive the spokes, a depressible center with radial arms for receiving the spokes, a plunger means with tapered plug for engaging the inner ends of the spokes and with a flange for pressing the same to position located to receive the said tables when they are swung successively thereto, coacting as specified.

3. In a machine for assembling wheels, the combination of a circular table with a depressible central locating ring for receiving an expanded felly outside thereof, a depressible plunger center with radial arms for receiving the spokes, and a plunger with tapered plug for engaging the inner ends of the spokes and with a flange for pressing the same to position, coacting as specified.

4. In a machine for assembling wheels, the combination of a circular table with a depressible central locating ring for receiving an expanded felly outside thereof and provided with spoke notches to receive the spokes, a depressible plunger center, and a plunger with tapered plug for engaging the inner ends of the spokes and with a flange for pressing the same to position, coacting as specified.

5. In a machine for assembling wheels, the combination of a circular table with a depressible central locating ring for receiving an expanded felly outside thereof, a depressible plunger center, and a plunger with a flange for pressing the same to position, coacting as specified.

6. In a machine for assembling wheels, the combination of a circular table with a depressible central locating ring for receiving an expanded felly outside thereof and provided with spoke notches to receive the spokes, a depressible plunger center with radial arms for receiving the spokes, and a plunger for pressing the same to position, coacting as specified.

7. A machine for assembling wheels comprising a turn table with a plurality of arms, a circular work plate carried by each arm having a depressible central locating spider with radial arms, and a metal felly centering and locating device; whereby the work plates may be swung to successive stations, and a plunger press means located over the work plate at one of the stations for forcing the spokes to place, coacting as specified.

In witness whereof, I have hereunto set my hand and seal.

HENRY FLICK. [L. S.]